(12) United States Patent
Kristensen et al.

(10) Patent No.: US 12,140,223 B2
(45) Date of Patent: Nov. 12, 2024

(54) TOY DIFFERENTIAL

(71) Applicant: LEGO A/S, Billund (DK)

(72) Inventors: Anders Merrild Kristensen, Billund (DK); Daniel Sri Sudarsono, Billund (DK); Henrik Atzen, Billund (DK); Jeppe Juul Jensen, Billund (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 17/768,366

(22) PCT Filed: Oct. 15, 2020

(86) PCT No.: PCT/EP2020/079012
§ 371 (c)(1),
(2) Date: Apr. 12, 2022

(87) PCT Pub. No.: WO2021/074282
PCT Pub. Date: Apr. 22, 2021

(65) Prior Publication Data
US 2024/0117877 A1    Apr. 11, 2024

(30) Foreign Application Priority Data
Oct. 18, 2019   (DK) .............................. PA201970652

(51) Int. Cl.
*F16H 57/08*    (2006.01)
*F16H 1/46*    (2006.01)
*F16H 48/08*    (2006.01)
*F16H 48/10*    (2012.01)

(52) U.S. Cl.
CPC ............. *F16H 57/082* (2013.01); *F16H 1/46* (2013.01); *F16H 2048/085* (2013.01); *F16H 2048/106* (2013.01)

(58) Field of Classification Search
CPC .. F16H 57/082; F16H 48/40; F16H 2048/085; F16H 2048/106
See application file for complete search history.

(56) References Cited

U.S. PATENT DOCUMENTS

| | | |
|---|---|---|
| 5,961,368 A | 10/1999 | Chu |
| 6,855,088 B1 | 2/2005 | Chu |
| 6,979,246 B2 | 12/2005 | Chu |
| 8,079,929 B2 | 12/2011 | Yeh |
| 9,039,560 B2 | 5/2015 | Cripsey et al. |
| 2010/0056320 A1 | 3/2010 | Ziech |

(Continued)

FOREIGN PATENT DOCUMENTS

| | | |
|---|---|---|
| CA | 2738258 | 10/2011 |
| CN | 208145464 U | 11/2018 |

(Continued)

OTHER PUBLICATIONS

International Preliminary Report on Patentability issued in corresponding international patent application No. PCT/EP2020/079012, mailed Jan. 17, 2022, 9 pages.

(Continued)

*Primary Examiner* — Huan Le
(74) *Attorney, Agent, or Firm* — Day Pitney LLP; George Chaclas; Anthony A. Kassas

(57) ABSTRACT

A gear differential comprising a bell shaped housing having and open end and slide grooves extending from the open end. Planetary gears are adapted for being inserted into the slide grooves in the bell shaped housing via the open end.

14 Claims, 3 Drawing Sheets

(56) References Cited

U.S. PATENT DOCUMENTS

2010/0075797 A1    3/2010  Hissam
2011/0263374 A1   10/2011  Cripsey et al.
2012/0238397 A1    9/2012  Yeh

FOREIGN PATENT DOCUMENTS

CN    109398078 A    3/2019
EP      0864779 A1   9/1998
EP      1460315 A2  12/2008
EP      3446906 B1   7/2020

OTHER PUBLICATIONS

Lego Technic, "42083 Bugatti Chiron Speed Build for Collectors—Technic Collection", (13/14), YouTube [video] [online], Brick Builder, Jun. 5, 2018, [Retrieved Mar. 9, 2020]. URL: https://www.youtube.com/watch?v=-19bwUeUB7g (see [7:40-7:50].
International Search Report and Written Opinion issued in corresponding International Patent Application No. PCT/EP2020/079012, mailed Dec. 22, 2020, 12 pages.
Search Report issued in corresponding Danish patent application No. PA201970652, dated Mar. 17, 2020, 10 pages.
CN Office Action corresponding to Application No. 202080067630.4, dated Dec. 15, 2023, 7 pages (Translation unavailable).

TOY DIFFERENTIAL

CROSS-REFERENCE

The present application claims priority to Danish Patent Application No. PA201970652 dated Oct. 18, 2019, and is a U.S. national stage application under 35 U.S.C. 371 of co-pending International Application No. PCT/EP2020/079012 filed on Oct. 15, 2020, the contents of each are incorporated by reference herein in their entirety for all purposes.

FIELD OF THE DISCLOSURE

The subject disclosure relates to a gear differential, and more particularly to a toy differential having a gear carrier, a main drive gear, a pair of drive axles, and at least one planet gear.

BACKGROUND

Gear differentials for toys, such as toy vehicles toy construction sets and the like are well known in many different embodiments used for providing the mechanical advantages in practical daily use, such as curve driving in vehicles of all kinds.

US patent application no. 2010/0075797 discloses a gear differential as mentioned above.

SUMMARY

The subject technology is directed to a differential of the above-mentioned kind being easy to assemble and dismantle with only relatively few components, and at the same time providing a differential that can transmit significant torque suitable for its use in various different toys, such as toy vehicles.

This is obtained by providing a gear differential further providing a bell shaped housing part with one slide groove arranged for each planet gear on the inside surface and extending parallel to the first axis of rotation and being adapted for sliding a planet gear from the open end to the closed end of the bell shaped housing.

Thereby an especially simple and compact but sturdy construction of the differential is provided which is also easy to assemble by just mounting the planet gears in respective groves directly inside the bell shaped housing and without the use of other components.

The invention also provides a computer-readable model comprising computer-readable instructions configured to cause, when processed by an apparatus for performing an additive manufacturing process, said apparatus to manufacture the toy building elements as defined above.

Each planet gear preferably has a circular outer periphery, and in this relation each slide groove may advantageously engage with the outer periphery of the planet gear arranged in the slide groove, so that a stable connection is obtained between the slide groove and the planet gear.

In an embodiment the lid part is releasably attached to the bell shaped housing, so that it is possible also to dismantle the toy differential.

In this relation it is advantageous if the lid part is attached to the bell shaped housing with a snap connection so that the assembly can be dismantled without the use of any tools.

In order to provide a differential that can transmit significant torque the bell shaped housing may have at least three slide grooves all arranged having equal distances between neighboring slide grooves.

In a further embodiment the sun gears as well as the planet gears are bevel gears.

An easier assembly is obtained when the bell shaped housing at the closed end has an opening to a pocket in the gear chamber extending in a direction perpendicular to the first axis of rotation, the pocket and the opening being adapted for insertion of one sun gear through the opening and into the pocket in the gear chamber. Thereby the user does not have to arrange one of the sun gears at the bottom of the bell shaped housing via the open end of it, but he can simply slide the sun gear into the bell shaped housing via the opening and into the pocket in the bell shaped housing.

In a further embodiment of the invention the lid comprises the main gear.

In a further embodiment each drive axle is attached to a sun wheel with a frictional or snap connection, so that it is even easier to assemble and dismantle the differential unit.

The subject disclosure is advantageous as a component in a toy construction set further comprising multiple building elements that can be releasable attached to each other to form an assembly such as a toy vehicle.

The components of the above mentioned differential unit may be produced in an additive manufacturing process by providing a computer-readable model comprising computer-readable instructions configured to cause, when processed by an apparatus for performing an additive manufacturing process, said apparatus to manufacture the toy building elements as defined above.

DETAILED DESCRIPTION

Figure 1:
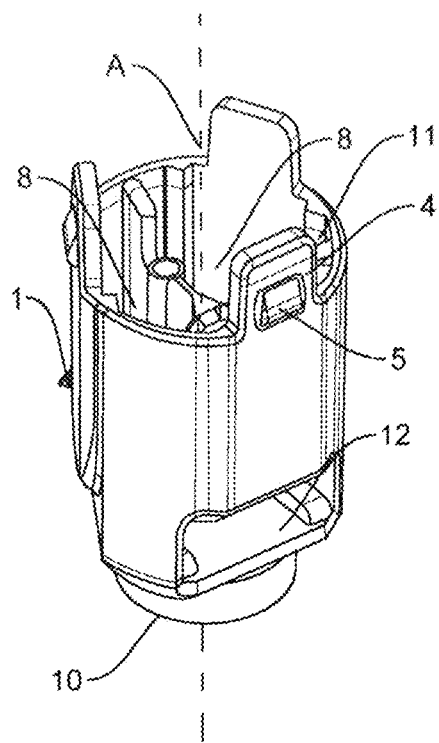
FIG. 1 is a perspective view showing one embodiment of a bell shaped housing according to the subject disclosure.
Figure 2:
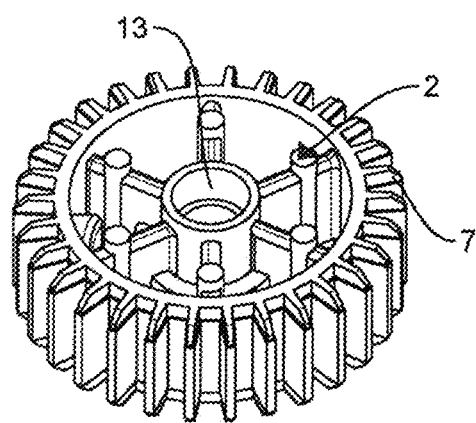
FIG. 2 is a perspective view showing one embodiment of a lid according to the subject disclosure.
Figure 3:
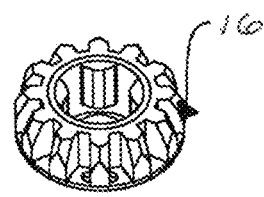
FIG. 3 is a perspective view showing one embodiment of a planetary gear or a sun gear according to the subject disclosure.

FIGS. 1, 2 and 3 show different components or parts that can be assembled to construct a gear differential according to one embodiment of the subject disclosure. The bell shaped housing 1 shown in FIG. 1, and the lid 2 shown in FIG. 2 constitutes the gear carrier when the lid part 2 is locked to the bell shaped housing 1 via a snap connection. For this purpose, the bell shaped housing 1 has resilient flanges 4 extending from the open end 11 of the bell shaped housing 1, and on the outside of each of the flanges 4, a snap projection 5 is arranged to engage with a corresponding snap groove (not distinctly shown) of the lid part 2, so that the lid part 2 closes the open end 11 of the bell shaped housing 1.

In this embodiment, the lid part 2 has a main drive gear toothing 7 arranged on an outer periphery, and thereby defining an axis of rotation A, as shown in FIG. 1, of the gear carrier when the differential is used as such in a construction or a vehicle.

The bell shaped housing 1 has at least one slide groove 8 having only one open end disposed at the open end 11 of the bell shaped housing 1, and extending parallel to the axis of rotation A and in the direction of a closed end 10 of the bell shaped housing 1. Each of these slide grooves 8 thereby forms a pocket adapted for insertion of planetary gears 9, shown in FIG. 5. The planetary gears 9, when inserted into the slide groove 8, each can rotate about a planetary axis of rotation (not distinctly shown) being perpendicular to and intersecting the axis of rotation A of the gear carrier.

Figure 4:
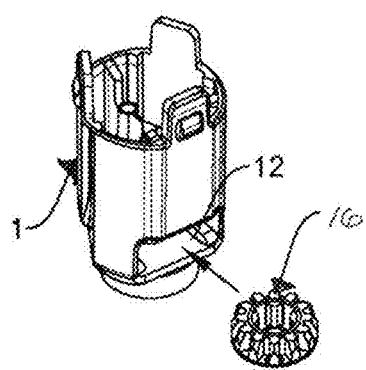
FIGS. 4, 5, 6 and 7 are perspective views showing four steps for assembling the differential using the parts shown in FIGS. 1, 2 and 3.

In this embodiment, the bell shaped housing 1 further has an opening 12 near the closed end 10. This opening 12 leads to a pocket for insertion of a sun gear 16 into the bell housing 1 as shown in FIGS. 3 and 4.

The aforementioned differential parts provide a differential that is very easy to assemble, and at the same time being very robust. To assemble, and as shown in FIG. 4, the first step is to insert a sun gear 16 into the opening 12 on the side of the bell shaped housing 1 as illustrated with an arrow.

Figure 5:
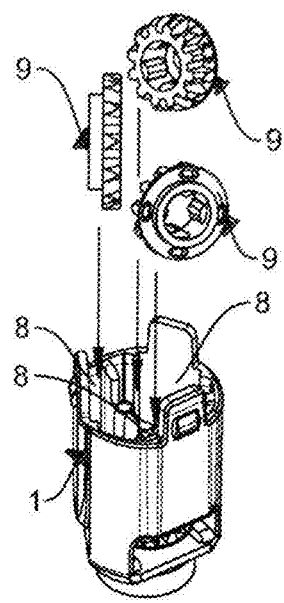

Then, three planetary gears 9 are each inserted into one of the slide grooves 8 as shown with the arrows in FIG. 5. In this position, each of the planetary gears 9 meshes with the sun gear 16 inserted in the opening 12 at the bottom of the bell shaped housing 1.

Figure 6:
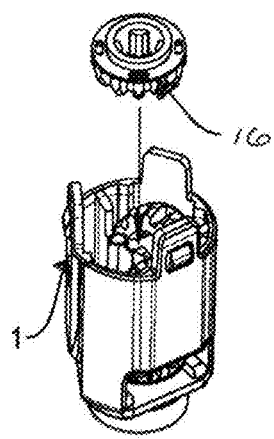

FIG. 6 illustrates that another sun gear 16 is arranged on top of, and thereby meshing with, the planetary gears 9 in the bell shaped housing 1 as illustrated with the arrow in FIG. 6.

Figure 7:
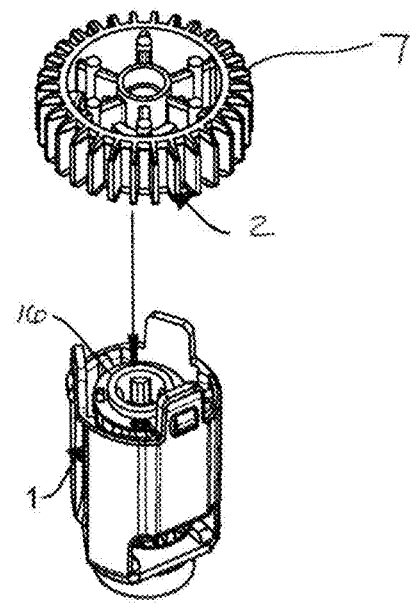

Then, the lid 2 is snapped onto the bell shaped housing 1 as illustrated by the arrow in FIG. 7, so that all the sun 16 and planetary gears 9 are safely enclosed in the gear carrier. The complete unit thereby forms a differential gear unit ready for insertion of drive axles 14 through axle holes 13 arranged in the lid 2 and in the bell shaped housing 1 (not shown).

Figure 8:
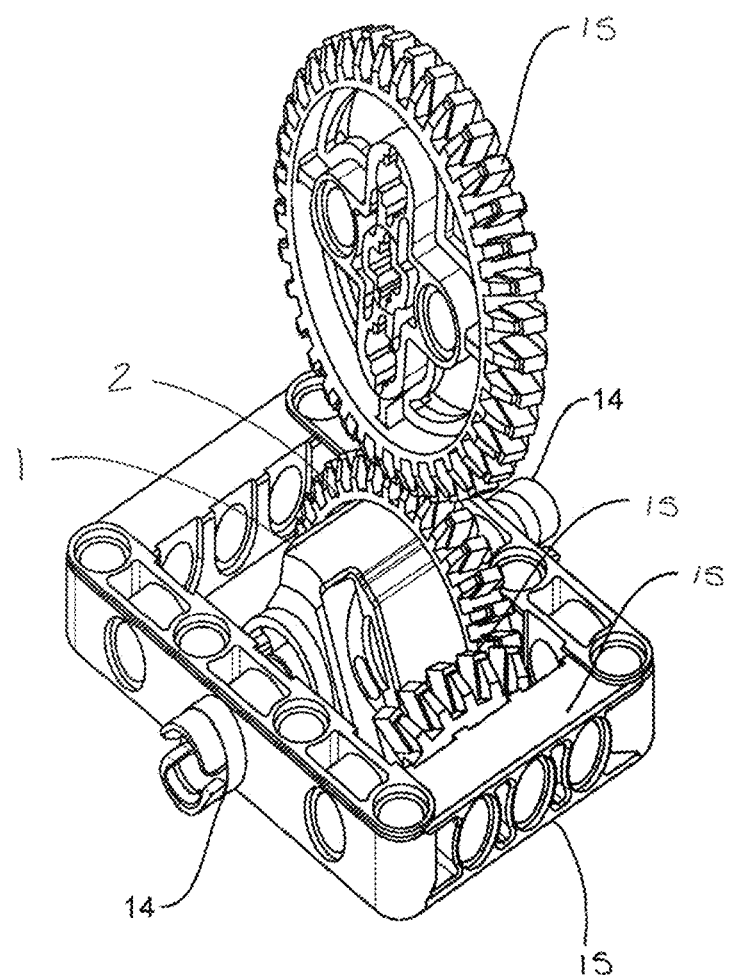
FIG. 8 is a perspective view of one embodiment of a complete differential assembly as shown in the preceding figures, forming part of a toy building set.

In FIG. 8, the differential gear unit is shown as part of a construction made from building elements 15 of a toy building set, and where the two drive axles 14 each are extending into the gear chamber inside the bell shaped housing 1 and lid part 2, and connected to one sun gear 16.

What is claimed is:

1. A toy differential comprising:
    a gear carrier having:
        a main drive gear defining an axis of rotation of the gear carrier;
        a bell shaped housing defining an inside surface extending between a closed end and an open end; and
        a lid part attached to the open end of the bell shaped housing to form a gear chamber;
    a first drive axle extending through the closed end of the bell shaped housing, and a second drive axle extending through the lid part of the gear carrier along a first axis of rotation, the first and second drive axle each being connected to at least one of two sun gears arranged inside the gear chamber; and
    a planetary gear arranged inside the gear chamber, the planetary gear being arranged to mesh with both of the two sun gears and to rotate with respect to the gear carrier about a planetary axis of rotation, the planetary gear arranged perpendicular to, and intersecting, the first axis of rotation,
    wherein:
    the bell shaped housing part has a slide groove arranged for the planetary gear on the inside surface and extending parallel to the first axis of rotation, the bell shaped housing configured for sliding the planetary gear in the slide groove from the open end to the closed end, and
    the bell shaped housing at the closed end has an opening to a pocket in the gear chamber extending in a direction perpendicular to the first axis of rotation, the pocket and the opening being adapted for insertion of one of the two sun gears through the opening and into the pocket in the gear chamber.

2. The toy differential according to claim 1, wherein the lid part is releasably attached to the bell shaped housing.

3. The toy differential according to claim 2, wherein the lid part is attached to the bell shaped housing with a snap connection.

4. The toy differential according to claim 1, wherein the planetary gear has a circular outer periphery, the slide groove engaging with the outer periphery of the planetary gear.

5. The toy differential according to claim 1, wherein the bell shaped housing has three slide grooves arranged having equal distances between adjacent slide grooves.

6. The toy differential according to claim 1, wherein the sun gears and the planetary gears are bevel gears.

7. The toy differential according to claim 1, wherein the lid comprises the main gear.

8. The toy differential according to claim 1, wherein each drive axle is attached to at least one of the two sun gears with a frictional or snap connection.

9. A toy differential comprising:
    an elongated housing defining:
        an axis;
        an open end;
        a closed end;
        a cavity proximate to the closed end; and
        at least one pocket extending axially along the elongated housing and opening to the cavity;
    a first sun gear mounted for rotation in the cavity;
    at least one planetary gear mounted for rotation in the at least one pocket and engaging the first sun gear;
    a second sun gear mounted for rotation proximate the open end and engaging the at least one planetary gear; and
    a lid enclosing the open end and coupled to the second sun gear, the lid having a main drive gear arranged on an outer periphery thereof, the main drive gear and sun gears configured for rotation about the axis,
    wherein the elongated housing further defines at least one flexible flange extending from the open end, the at least one flexible flange having a projection radially outward configured to releasably capture the lid.

10. The toy differential of according to claim 9, wherein the at least one pocket is three pockets and the at least one planetary gear is three planetary gears.

11. The toy differential of according to claim 9, wherein the toy differential is configured for operation within a toy vehicle.

12. The toy differential of according to claim 9, wherein each pocket forms a channel and the at least one planetary gear has a hub snugly fit in the channel.

13. The toy differential of according to claim 9, further comprising a first axle connected to the first sun gear and a second axle connected to the second sun gear for rotation therewith.

14. A toy vehicle building set comprising:
    a toy differential having:
        an elongated housing defining:
            an axis;
            an open end;
            a closed end;
            a cavity proximate to the closed end; and
            at least one pocket extending axially along the housing and opening to the cavity;
        a first sun gear mounted for rotation in the cavity;

at least one planetary gear mounted for rotation in the at least one pocket and engaging the first sun gear;
a second sun gear mounted for rotation proximate the open end and engaging the at least one planetary gear;
a lid enclosing the open end via a snap connection and coupled to the second sun gear, the lid having a main drive gear arranged on an outer periphery thereof, the main drive gear and sun gears configured for rotation about the axis;
a first toy vehicle drive axle connected to the first sun gear; and
a second toy vehicle drive axle connected to the second sun gear.

\* \* \* \* \*